Jan. 14, 1930. L. S. ROSENER 1,743,397
APPARATUS FOR HANDLING SHEETS
Filed May 17, 1927 7 Sheets-Sheet 1

Fig. 1a

INVENTOR
LELAND S. ROSENER
BY Charles S. Evans
HIS ATTORNEY.

Jan. 14, 1930.   L. S. ROSENER   1,743,397
APPARATUS FOR HANDLING SHEETS
Filed May 17, 1927   7 Sheets-Sheet 2

Fig. 1b

INVENTOR
LELAND S. ROSENER
BY Charles S. Evans
HIS ATTORNEY.

Patented Jan. 14, 1930

1,743,397

UNITED STATES PATENT OFFICE

LELAND S. ROSENER, OF SAN FRANCISCO, CALIFORNIA, ASSIGNOR TO THE PARAFFINE COMPANIES, INC., OF SAN FRANCISCO, CALIFORNIA, A CORPORATION OF DELAWARE

APPARATUS FOR HANDLING SHEETS

Application filed May 17, 1927. Serial No. 192,050.

The invention relates to mechanism for handling long strips of material and especially to handling long sheets of printed floor covering.

One of the objects of the invention is the provision of an apparatus for efficiently and easily handling the long heavy strips of floor covering as they emerge from the printing machine with the applied design still wet, so that the freshly printed strip may have full opportunity to dry without injury to the surface, and may then be withdrawn from the drying racks to be looked over on the inspection table and finally cut up into rugs.

The invention possesses many other objects and features of advantage, some of which will be set forth in the following description of the invention which is illustrated in the drawings forming part of the specification. It is to be understood that I do not limit myself to the showing made by the said description and drawings, as I may adopt varying forms of the invention within the scope of the claims.

Referring to the drawings:

Figures 1ª, 1ᵇ and 1ᶜ together constitute a side elevation of the complete apparatus, showing the building housing the same in vertical section. Parts of the apparatus as shown in side elevation and parts in section. In Figure 1ª is shown the printing machine in side elevation and the receiving end of one tier of racks in section. Figure 1ᵇ shows the opposite or discharge end of the same tier of racks together with the hauling-in mechanism and the hauling-out mechansm in side elevation, one side of the downwardly extending loop being also shown. Figure 1ᶜ shows the other side of the loop with the loop control safety mechanism in side elevation and also the inspection table in side elevation. In all of the figures portions are omitted to reduce their size since the apparatus as actually installed is of very large proportions. For example, the height of the upper feed roll shown in Figure 1ᵇ above the floor in the installation now being described is more than sixty feet.

In the manufacture of printed floor coverings, it is advantageous to print the design on long strips of the base material, which are drawn into drying racks as the printing proceeds. After the strip comprising the applied design has dried, the strips are drawn out of the drying racks, carefully inspected and cut up into single rugs.

In terms of broad inclusion, the apparatus of this invention comprises a plurality of tiers, preferably three in number, each tier comprising a rack adapted to support a long heavy strip of wet printed floor covering during the period necessary for it to dry. Means transversely movable across one end of the plurality of tiers of racks is provided for hauling the rugs on to the selected racks as they leave the printing machine; and this hauling-in mechanism also includes vertically adjustable means for positioning the hauling-in cable opposite the selected rack. Preferably two hauling-in cables are provided so that no time need be lost at the end of one rug strip, in starting the leading edge of the next rug strip into its proper rack. It is obvious that this hauling-in mechanism is positioned opposite the same tier of racks at the other end of which is the printing machine. The printing machine is also movable laterally across the ends of the tiers. Arranged adjacent the hauling-in mechanism and on the same end of the tier is a group of mechanisms for pulling the dry rug strips out of the racks; and this group of mechanism is also movable transversely across the ends of the tiers and independently of the hauling-in mechanism. This group of mechanisms includes means for gripping the end of a dry rug strip and pulling it out of the rack in such position that it may then be operated upon by a stapling machine or sewing machine to secure it to the tail end of the strip previously pulled out.

Mechanism is also included in the pulling-out mechanism for continuing the withdrawal of the two strips now fast together and permitting them to be drawn along an inspection table where the rug strip may be examined for defects. It will be noted that while the operation of the printing mechanism and the hauling-in mechanism may be continuous, the pulling-out of the dry rugs must be interrupted long enough to attach the leading end of one rug to the trailing end of the previously withdrawn rug. It will also be noted that the inspection table must be intermittent in its operation, since the strip must be cut up into rugs at intervals. In order to permit compensation for this variation in the continuity of movement of the rug strip from the printing mechanism to the inspection table, the rug strip is permitted to form a deep loop between the pulling-out mechanism and the inspection table and this loop is utilized in the operation of safety means for stopping the conveyors of the inspection table, or the feed rollers of the pulling-out mechanism, so that the loop of the rug strip will not become too short and tight on the one hand or pile up in folds on the floor on the other hand, in either case inevitably damaging the rug strip. The mechanism is operated electrically throughout and numerous safety devices for the close and accurate control of the rug strip are provided.

Figure 1A:
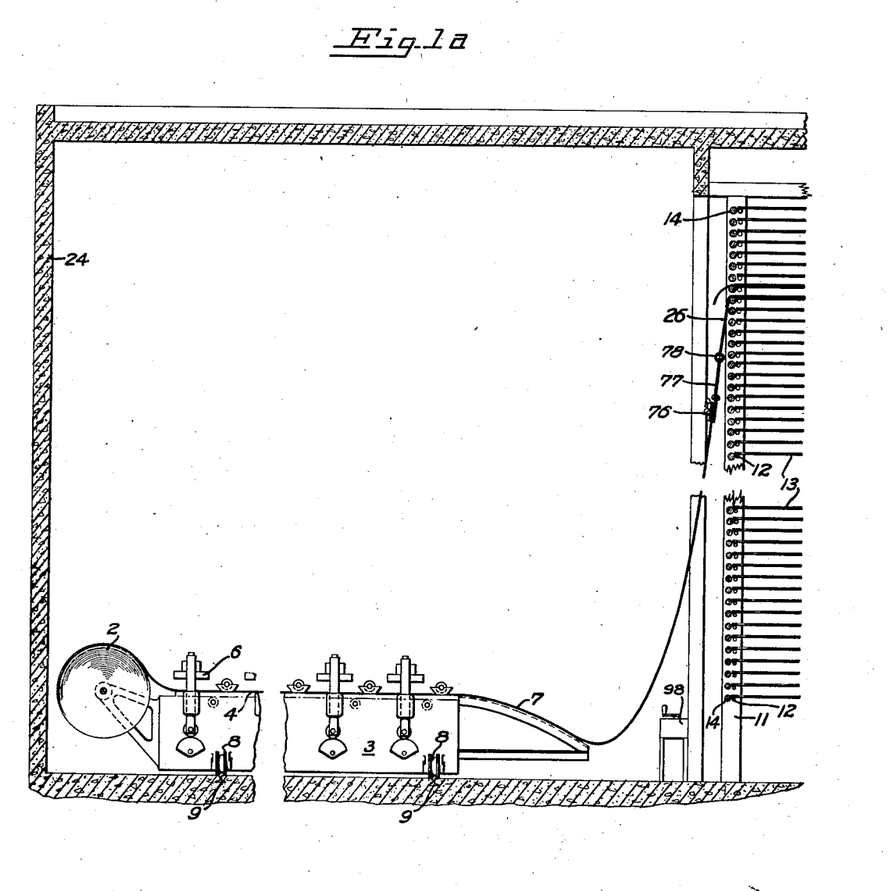

In presenting a detailed description of the invention, it will be most convenient to describe the groups of mechanisms separately. The printing machine shown in Figure 1ª needs no detailed description, since it forms no part of the present invention, further than to say that a roll 2 of the strip material on which the rug is to be printed is suitably mounted at one end of the machine frame 3. As the rug is drawn across the platen 4 of the machine, the colors comprising the rug design are applied by the blocks 6, so that upon the issuance of the rug strip 7 from the machine, the pattern in wet pigment lies on the surface thereof. The printing machine is mounted on rollers 8 adapted to run on the tracks 9 set in the floor, so that the machine may be positioned in front of one of the tiers of racks into which the rug strip is drawn as it is printed.

In the present embodiment of the invention, there are three tiers of racks for holding the drying rug strips. These tiers are preferably separated by a narrow passageway thru which the workmen may pass, and each tier comprises vertical supporting standards 11, spaced at suitable intervals lengthwise of the tier; and corresponding standards on each side are connected by pipes 12 extending transversely across the tier. Resting on the pipes 12 are flat strips 13 extending the entire length of the tier and spaced apart at suitable intervals transversely of the tier so as to form a support on which the long printed rug strip may rest while drying. The strips 13 are spaced but a few inches apart and the entire tier extends from the floor upwardly forty or more feet, so that a large number of racks in each tier is provided. Adjacent the entrance end of each rack is journaled a roller 14 over which the rug strip is drawn into the rack.

Means are provided for drawing the rug strip into the selected rack as it leaves the printing machine. On the opposite side of the tier from the printing machine is arranged a frame comprising two outer vertical columns 16 and two inner columns 17, connected at the bottom and provided with grooved wheels 18, adapted to run on a track 19, and at the top provided with a platform 21, having a slideway 22 on one side thereof adapted to engage a rail 23 fixed in the wall 24 of the housing structure. The frame thus formed is capable of movement across the ends of the tiers, so that it may be positioned opposite the tier into which the rug strips are to be drawn. This frame is provided with two hauling-in cables 26 and 27, with means for operating each so that no time need be lost when one rug strip is finished in starting the next following rug strip into its rack.

Figure 2:
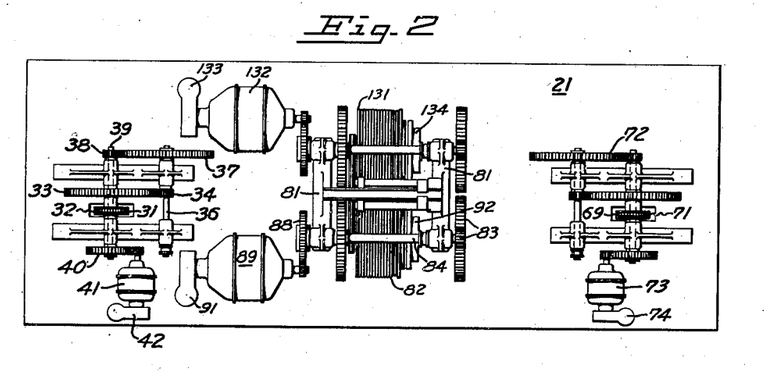
Figure 2 is a plan view of the driving means for the hauling-in mechanism.

Arranged for vertical adjustment on the frame 16—17 is a mounting for the pulley 28 over which the hauling-in cable passes and obviously this pulley must be positioned opposite the rack into which the rug strip is being hauled. This mounting comprises a block 29 slidably arranged on the edge flange of the vertical frame member 17. The block is connected to one side of the endless chain 31 which passes over a sprocket at the bottom of the frame and a similar sprocket 32, Figure 2, at the top of the frame so that movement of the chain on the sprockets raises or lowers the block 29. The sprocket 32 is fixed for rotation with a gear 33 meshing with the pinion 34 on the shaft 36 which also carries the gear 37 meshing with the gear 38 fixed on a shaft 39. The shaft extends thru the gear 33 and the sprocket 32 to provide a journal therefor and at the opposite end is provided with a gear 40, driven by the reversible motor 41. By the train of gears thus provided on the platform 21, the motor drives the sprocket 32 at reduced speed, to position the block 29 as desired. In order to prevent the momentum of moving parts carrying the block too far, the motor is provided with a magnetic brake 42. The brake is applied by a spring when the motor circuit is broken, and when the motor circuit is made, the brake is released by the action of a shunt current thru suitable windings in accordance with known practice.

Extending from one side of the block 29 is an arm 43 on the end of which the pulley 28 is journaled; and an arm 44 extends from the opposite side of the block and is provided on its end with a slideway 46, adapted to move up and down on the adjacent flange of the column 16. Thus the structure comprising the arms 43 and 44 is rendered stable in whatever position it may be adjusted, against the stresses applied by the hauling-in cable running over the pulley 28.

Means are provided for controlling the motor 41 and for automatically checking the upward and downward movement of the blocks 29. The reversible motor 41 is controlled by the spring pressed switches 51 and 52, closed respectively by the solenoids 53 and 54. The solenoid 53 is controlled by the portable push button switches 56, three of which are arranged in parallel on a suitable cable 57 within easy access of an operator standing on one of the platforms 58 at the discharge end of the tiers. Arranged adjacent the top of the column 17 is a switch 59 in series with the push button switches 56 and adapted to be opened if the block 29 is permitted to ascend so as to form contact therewith. The solenoid 54 is similarly controlled by the portable push button switches 61, three of which are arranged in parallel on a suitable cable 62, side by side with the cable 57. This circuit also is in series with the safety switch 63, disposed adjacent the bottom of the column 17, so that if the block descends too far the circuit is broken. Thus it will be understood that the solenoids 53 and 54 are controlled by separate switches 56 and 61 respectively and that these groups of switches 56 and 61 are in series with safety switches 59 and 63 respectively, the safety switch 59 being opened by movement of the block too far upwardly and the safety switch 63 being opened by downward movement too far. In case either of the safety switches is opened, the operator may lower or raise the block, as the case may be, by resort to one or the other series of push button switches.

A similar structure duplicating that just described, comprises the arms 64 and 66 projecting from the block 67, and providing a mounting for the pulley 68, over which the hauling-in cable 27 passes; and this structure is also vertically adjustable by means of the endless chain 69 controlled by a sprocket 71, driven thru a gear train 72 similar to that already described, by the motor 73. This motor is provided with the magnetic brake 74 and an equipment of solenoid operated switches controlled by portable push button switches similar to that described in connection with motor 41. The wiring diagram for the control of motor 41 is shown in the upper left hand corner of Figure 9 and the controls for the motor 73 are not shown in the figure, but are identical and are connected in parallel therewith.

Figure 1B:
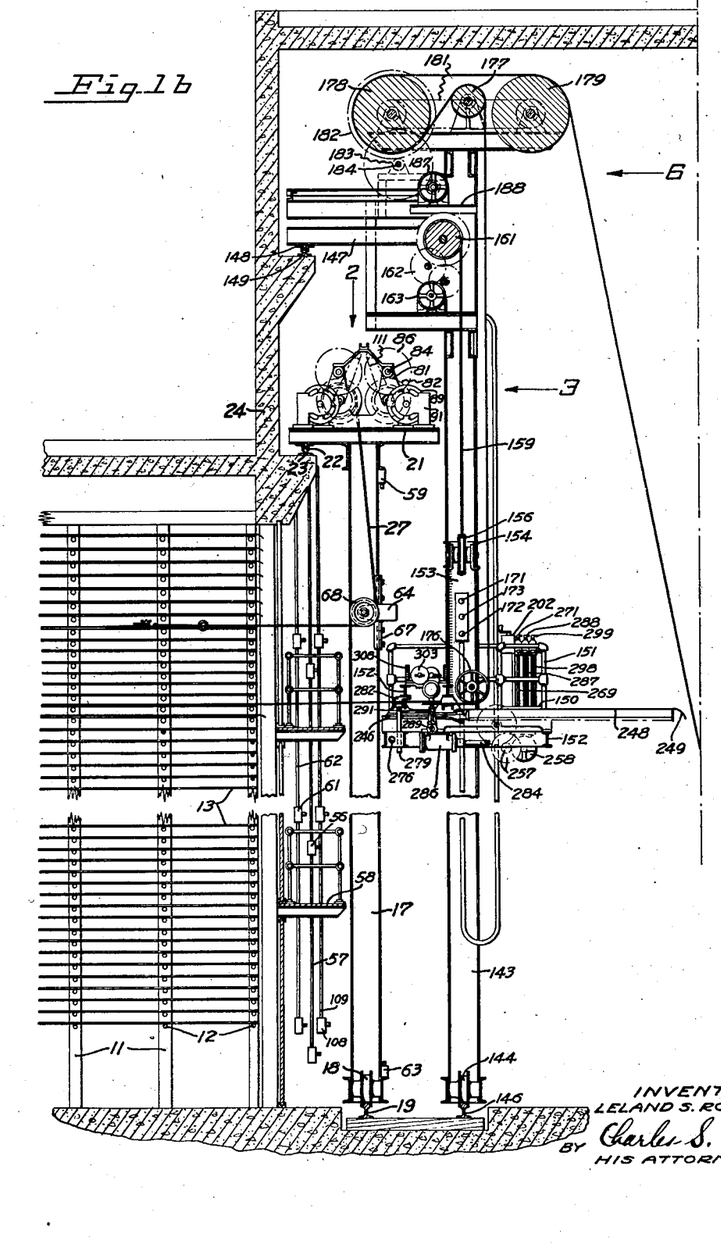

When a length of rug strip sufficient to fill a rack has been printed, the strip is severed. The leading end of the rug strip is then perhaps forty feet from the discharge end of the rack and is connected to one of the hauling-in cables. The hauling in of this strip then continues, and meanwhile the other hauling-in cable is connected to the leading end of the next succeeding rug strip and printing continues without loss of time. The means for attaching the hauling-in cables to the ends of the rug strips may be of any suitable type, but I prefer to use a two-jaw bar 76 adapted to be clamped over the leading edge of the rug strip and connected by the lines 77 extending from the ends of the clamping bar to the ring 78 at the end of the hauling-in cable. After the rug strip has been hauled into position in the rack with its leading end projecting a few inches from the discharge end thereof, as shown in Figure 1$^b$, the clamp is detached and carried back thru the desired rack to the entrance end by a workman operating in one of the passages separating the tiers, so that it is ready for attachment to the leading end of a rug as soon as the one being hauled in is in position.

Means are provided for winding up the hauling-in cable. Journaled upon a shaft 79, journaled in suitable hangers 81, arranged on the platform 21, is a drum 82 about which the hauling-in cable 27 is wound. The shaft 79 is connected thru the gears 83, shaft 84 and gears 86 with the sleeve 87, the outer end of which is connected by the gears 88 with the motor 89. The shaft 79 is journaled within the sleeve for free rotation therein, so that the motor 89 drives the shaft 79 thru the gear train described at reduced speed. The motor 89 is also provided with a magnetic brake 91 similar to brake 42 already described, to facilitate abrupt stoppage of the motor and gear train.

A magnetic clutch 92 is provided for connecting the shaft 79 to the drum 82, and means are also provided for automatically braking the drum immediately the clutch is released, and for the independent and dual control of the motor. The motor 89 is controlled by the stop and start switches 96 and 97 respectively, and its speed is determined by the controller 98, all arranged adjacent the printing mechanism at the receiving end of the tiers of racks. The energization of the clutch 92 is controlled by a switch 99, also arranged near the controller 98. These switches and the controller may be arranged on a portable support to move with the printing mechanism across the face of the tiers of racks, or a plurality of groups of such switches and controller may be conveniently arranged one in front of each tier of racks and connected in parallel.

Figure 3:
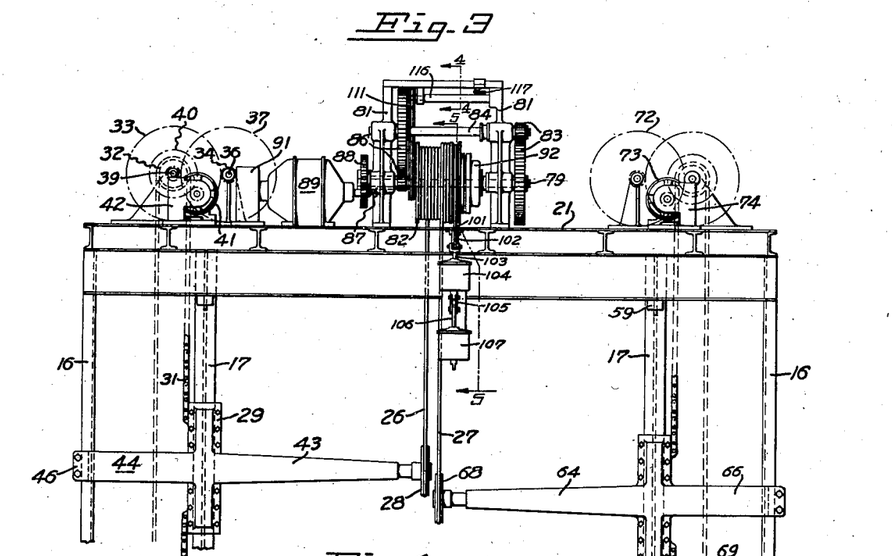
Figure 3 is a front elevation of the hauling-in mechanism. Both views are taken from a direction indicated by the arrows of Figure 1ᵇ.
Figure 4:
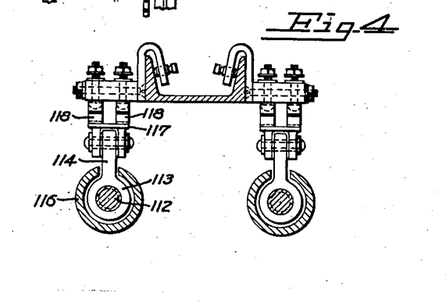
Figure 4 is a vertical sectional view thru a portion of the hauling-in mechanism, the plane of section being indicated by the lines 4—4 of Figure 3.
Figure 5:
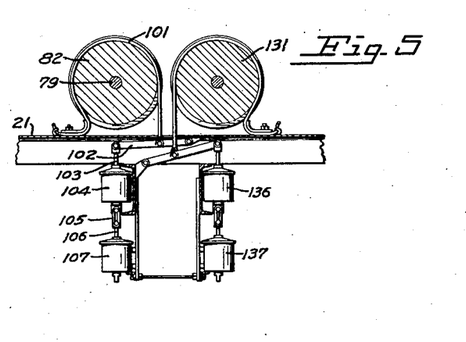
Figure 5 is a side elevation partially in section and showing the brakes on the drums of the hauling-in mechanism.

Referring particularly to Figures 3 and 5, the drum 82 is formed at one end with a groove abut which extends a cable 101, one end of which is connected to the platform 21 and the other of which is connected to a lever 102, the end of which is connected to the plunger 103 of a solenoid 104. The plunger of the solenoid extends therethru and is connected by the slotted link 105 with the plunger 106 of a second solenoid 107 located below the first solenoid. The solenoids 104 and 107 are connected across the clutch supply leads and the motor supply leads respectively, so that they are energized to hold up the plungers 103 and 106 to prevent braking action of the cable 101 on the drum 82 when there is current in the motor and clutch supply leads. If the motor supply leads should fail, the solenoid 107 is deenergized and the plunger 106 merely hangs from the plunger 103, the solenoid 104 being energized and maintaining the connection between the drum and the shaft thru the train of gears to the motor 89. This would prevent the unwinding of the drum in the event such failure of current should occur when a rug strip is first entering a supply rack. If the supply leads for the solenoid 104 should fail or the clutch switch 99 be opened, the solenoid is deenergized and the weight of the plunger 102 exerts a tension on the cable 101 and brakes the drum. If thru some accident, the power in all of the lines is interrupted, both the solenoids 104 and 107 are deenergized and the combined weights of the plungers 103 and 106 apply tension to the cable 101 and effectively stop rotation of the drum. The internal construction and windings of the solenoids 104 and 107 is shown in the wiring diagram of Figure 9, but need not be described in detail since it is of well known construction.

Means located at the receiving end of the racks for the control of the hauling-in cable has just been described. During most of the time the rug strip is being hauled into its rack, the control of the hauling-in drum is in the hands of an operator at this end of the racks adjacent the printing machine so that he can start or stop the drum in accordance with the conditions as he views them on the printing mechanism. As the leading end of the rug nears the discharge end of the rack, however, it is advisable to dualize the control of the hauling-in mechanism, so that an operator standing on one of the platforms 58, or on the floor below the platforms, can accurately place the rug by stopping the hauling-in mechanism at precisely the right moment. Means are therefore provided for automatically establishing dual control of the motor 89 thru the push button switches 108, three of which are arranged in parallel on a suitable cable 109 hanging adjacent the cables 57 and 62.

Fixed for rotation with the drum 82 is a sprocket carrying the chain 111 which passes over a second sprocket disposed on the threaded shaft 112 so that the shaft 112 rotates with the drum. Mounted on the shaft 112 is a nut 113 having an arm 114 projecting upwardly thru a guide casing 116, so that the nut and arm move back and forth in accordance with the rotation of the threaded shaft. On the upper end of the arm 114 is a shoe 117 adapted at one end of the travel of the nut to close the circuit across the terminals 118. This circuit is connected to a solenoid 119, operatively connected to a switch 121, the closing of which energizes a circuit controlling the solenoid 122. With the actuation of this solenoid, a switch 123 is closed, thus throwing a resistance 124 into the windings of the motor 89. This is effective to slow down the motor 89 so that the rug strip moves very slowly. Simultaneously with the closing of the switch 121, the solenoid 119 also closes a switch 126, which closes the circuit thru a solenoid 127. This solenoid operates a switch 128 effective to cut the push button switches 108 into the control leads for the motor 89, so that an operator with one of these push button switches in his hand may instantly stop the motor 89 when the leading end of the rug strip projects slightly from its rack. Simultaneously with the stopping of the motor, a pilot light 129 is energized, and this is a signal to the operator adjacent the controller 98 to open the motor stop switch 96.

The hauling-in mechanism just described in connection with the cable 27 is duplicated for the cable 26, and need not be separately described further than to identify the drum 131, driving motor 132, having the magnetic brake 133, the magnetic clutch 134, the brake solenoids 136 and 137 for the drum 131, a controller 138, switch 139 for the clutch 134, and stop and start switches 141 and 142 respectively, for the motor 132. It should further be noted that the switches 108 are so connected with the duplicate control systems that when the cable 26 is in use they are cut into the control leads for the motor 132 in the same manner as described in connection with the motor 89.

Thus the hauling in of the rug strips continues until the racks are filled, it being contemplated that by the time the three tiers of racks are filled, the first printed rug strips will have sufficiently dried to permit their withdrawal. Means are therefore provided for pulling the dry rug strips out of the racks and delivering them to an inspection table. This pulling-out mechanism is divisible into two groups, the first for pulling the rug strip out of the rack into position so that it may be secured to the trailing end of the next preceding rug; and the second group for moving the connected strips together, the front portion advancing over the inspection table and the rear portion progressing out of the rack. Arranged adjacent the structure comprising the hauling-in mechanism, but so that it may be moved across the end of the tiers of racks independently of the pulling-in structure is a frame comprising vertical columns 143 connected at the bottom and provided with grooved wheels 144 adapted to roll on the track 146 and at the top provided with a plurality of arms 147, having thereon a slideway 148, adapted to engage a track 149, secured to the housing structure 24, so as to maintain the frame in a stable vertical position.

Figure 6:
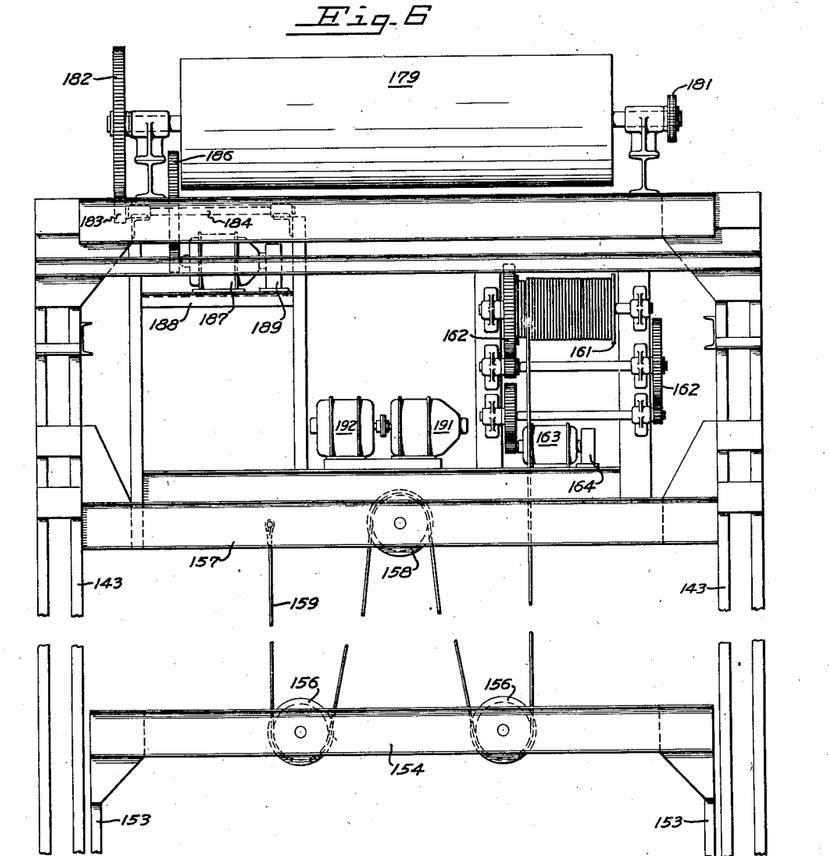
Figure 6 is a front elevation of a portion of the pulling-out mechanism, portions of the figure being omitted to reduce its length. The direction from which the view is taken is indicated by the arrow 6 in Figure 1ᵇ.

Slidably arranged between the columns 143 is a platform 150 surrounded by a safety railing 151 and upon which an operator is stationed. This platform is arranged on a frame 152 having standards 153 connected across the top by a beam 154 in which two pulleys 156 are journaled. Journaled in a cross-bar 157 extending between the two columns 143 is a pulley 158, and a cable 159, secured at one end to the cross-bar 157, is threaded around the pulleys as shown in Figure 6, and its end carried around a drum 161, connected thru a suitable gear train 162, with a reversible motor 163, having a magnetic brake 164. This motor is controlled by the switches 166 and 167, actuated by the solenoids 168 and 169 respectively. The solenoid 168 is controlled by the switch 171 and when this switch has been closed to actuate the solenoid 168 to close the switch 166, the motor 163 rotates in a direction to raise the platform upon the closing of the start and stop switch 172. The solenoid 169 is controlled by the switch 173 and when this switch is closed to actuate the solenoid 169 to close the switch 167, rotation of the motor is in the direction to permit the lowering of the platform with the closing of the switch 172. These switches 171, 172 and 173 are arranged conveniently on the operator's platform 150.

Means are provided on the frame comprising the columns 143 and on the vertically movable platform for threading a rug strip over suitable guide and feed rollers, so that when the trailing edge of the strip is connected to the leading edge of a rug strip in the rack, the connected strips may be drawn over the feed rollers and delivered in a long loop to the inspection table. Journaled on the platform 150 is a guide roller 176, adapted with proper positioning of the platform, to lie opposite the rack from which a rug is to be drawn. At the top of the frame comprising the columns 143 is a guide roller 177, lying between two feed rollers 178 and 179, connected for rotation together by the chain 181. The feed roller 178 is fixed on the same shaft with a gear 182, connected by gears 183, shaft 184 and gear 186 with the motor 187, disposed on a suitable support 188, arranged in the frame and provided with a magnetic brake 189.

Figure 1C:
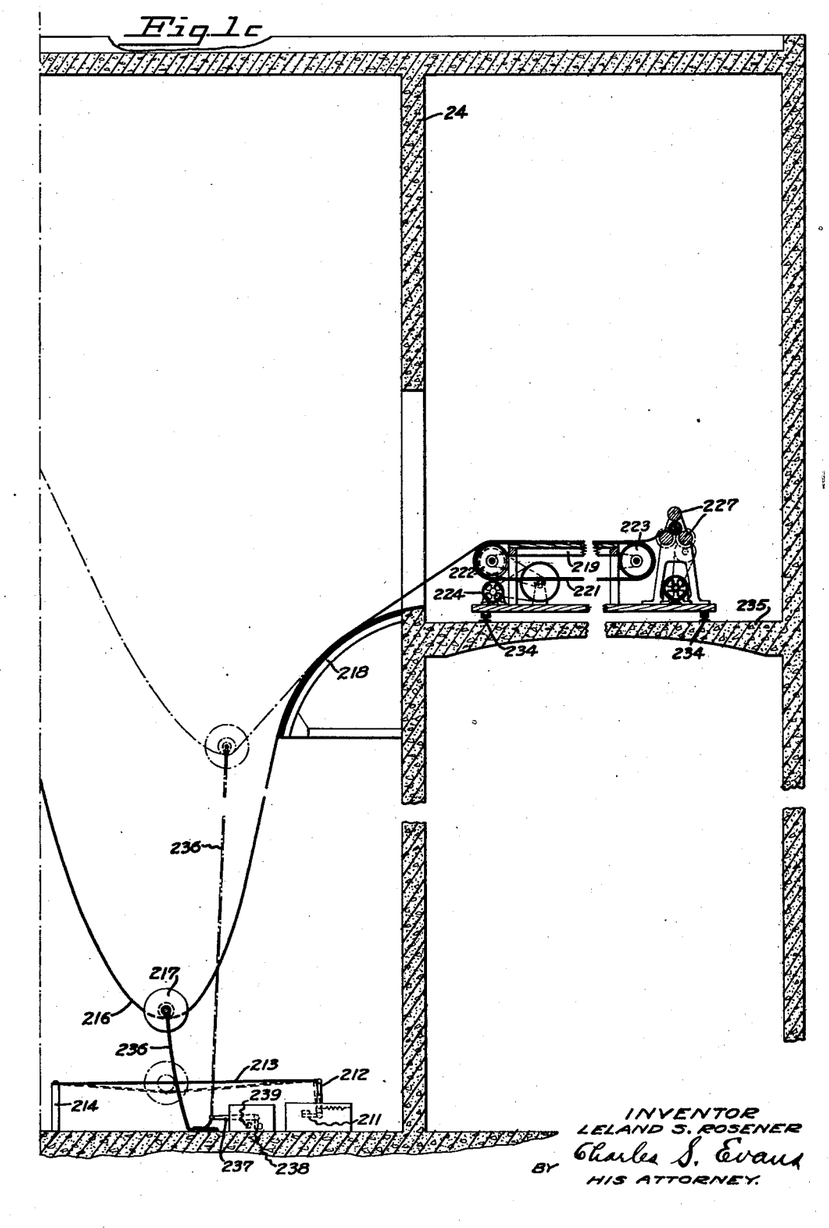

The current for the motor 187 is derived from the generator 191 directly connected to a motor 192 in the well known Ward Leonard system of speed control. Closure of the switch 193 arranged adjacent the operator's platform 150 energizes the solenoid 194 to close the switch 196 controlling the main leads of the motor 192. It also closes a smaller switch 197 to energize a solenoid 198 to close the spring opened switch 199 in the circuit 201, connected into the controller 202 and including the magnetic brake 189 and the solenoid 203, which operates the spring opened switch 204 controlling the circuit 206 connecting the generator 191 and the motor 187. The controller 202 is connected to the field 207 of the generator 191, so that movement of the handle of the controller varies the field to vary the output of the generator, so as to vary the speed of the motor 187. The circuit 201 is controlled by a main switch 208 and a branch circuit in this line supplies the field 209 for the motor 187. Also controlled by the switch 197 and in series with the solenoid 198 is a safety or limit switch 211, the opening of which permits the opening of the switches 199 and 204, and the application of the brake 189. This limit switch 211 is also seen at the lower portion of Figure 1ᶜ and is opened by movement of the lever 212. This lever is connected by a flexible web 213 to a fixed support 214 and the web is so located as to be engaged by the lower end 216 of the loop delivered from the feed roller 179 when the loop approaches close to the floor. In order to insure a desirable tautness of the loop, a flanged roller 217 is permitted to ride freely in the loop of the rug strip. If for any reason the rug strip is delivered from the feed roller 179 faster than it is being taken care of on the inspection table, the loop gradually lengthens until it strikes the web 213, pulling over the lever 212 and opening the switch 211, with the result already explained.

The advancing end of the rug strip is carried up over a curved guideway 218 on to the inspection table comprising a suitable frame 219, over which a plurality of endless belts 221 move. The belts are carried on the roller pulleys 222 and 223, the first of which is driven thru suitable speed reducing mechanism by the motor 224. As the rug strip passes over the inspection table, it is examined and classified and at the end of the inspection table is cut by hand into its component rugs. Each of the rugs is then rolled up about a mandrel in a well known manner, between rollers 227, and the rolled up rug encased in a suitable container. The motor 224 for driving the conveyor belts on the inspection table is controlled by the switch 228 in a well known manner, so that when starting, a resistance 229 is included in the motor circuit 231, to give low speed to the motor. Later this resistance is cut out and the motor operates at a speed determined by a spring operated rheostat 232. Means comprising a rope 233 extending along the side of the inspection table is provided for moving a rheostat control lever and permits the operator at this point to not only vary the speed of movement of the rug strip but to stop such movement entirely if need arise. The inspection table frame is also mounted for transverse movement on the tracks 234, by means of suitable supporting rollers, so that it may be alined with the tier out of which the rug strips are to be drawn. Preferably the table is arranged on an elevated floor 235 forming part of the housing structure 24, to facilitate the maintenance of the loop. After the severance and packing of the undivided rugs, they may be dropped thru a suitable chute to the shipping floor below.

In order to guard against the possibility of the inspection table drawing the rug strip too rapidly from the loop, means are provided for stopping the motor 224 when the loop reaches a predetermined position. Fastened to each side of the flanged roller 217 is a cable 236, the ends of which are connected to a lever arm 237 connected to a bar 238 normally closing a gap in the circuit of the motor 224. If the proportionate speeds of the feed rollers 179 and inspection table conveyor belts is such as to unduly shorten the loop, tension is applied to the cables 236 as indicated in the dash and dot lines of Figure 1ᶜ, resulting in the opening of the gap and the stopping of the motor 224. If the feed rollers 179 still continue to operate, this of course lengthens the loop and slackens the cables 236, thus permitting the bar 238 to again close the gap and start the motor 224 once more. If for any reason the feed rollers 179 are stopped, the continued operation of the inspection table conveyor belts ultimately shortens the loop and opens the gap in the motor circuit, followed almost immediately by the closing of the gap between the terminals 239, in circuit with a signal light 241, adjacent the controller 202. This signal informs the operator on the platform 150 that the loop is tight and that the inspection table can take no more rug strip until more strip is fed over the feed rollers 179. This signal light would also advise the operator that the inspection table was handling the rug strip faster than his feed rollers were delivering it and would be a signal to him to increase the speed of delivery. Arranged adjacent the inspection table are red and green signal lights 242 and 243, so arranged as to indicate the condition of the loop, the red light indicating the highest position of the loop and the green light indicating the lowest position of the loop to the operator in charge of the inspection table.

Figures 7, 8:
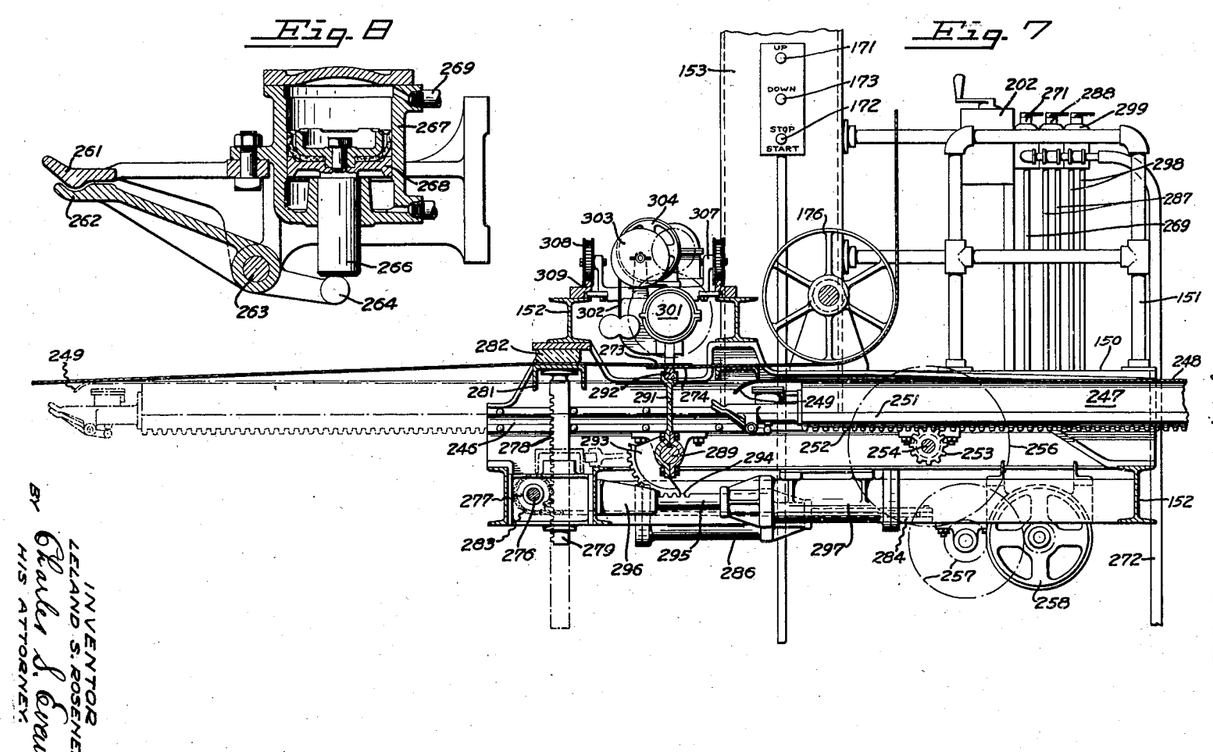
Figure 7 is a side elevation of the splicing table and contained portions of the pulling-out mechanism. The grappling jaws for initiating the hauling out movement are shown in dotted lines in their extended position and in the full lines in their retracted position.
Figure 8 is a vertical sectional view of one of the grappling jaws. The scale of the drawing is considerably larger than that of Fig. 7.

As previously noted, the pulling-out mechanism includes means for pulling the dry rug out of the rack, so that its leading edge may be secured to the trailing edge of the preceding rug. Fixed underneath the platform 150 on the frame 152, at each side, is a slideway 246 in which is slidably arranged a frame 247 having a metallic top 248, each end 249 of which is downwardly curved. The slides on the frame 247 are furnished by the flanges 251, each of which is provided with rack teeth 252 engaged with a pinion 253 arranged on the shaft 254. The shaft is also provided with a gear 256, connected by the gears 257 with the reversible motor 258, so that rotation of the motor is effective to move the frame 247 back and forth in the slideways 246. The motor is controlled by the switch 259, manually operated and conveniently arranged on the platform 150. Figure 7 shows the frame 247 in full lines in retracted position, and in extended position in dash and dot lines.

Arranged on the front end of the frame 247 are a plurality of gripping clamps for seizing the edge of the rug strip projecting from the rack. Each clamp comprises a fixed jaw 261 and a movable jaw 262, mounted on a pivot pin 263 and having an arm 264 disposed below the end of the piston rod 266, projecting downwardly thru the bottom of the air cylinder 267, from the piston 268 disposed therein. The lower end of the cylinder below the piston is open to the atmosphere, but the upper end of the cylinder above the piston is connected by the pipe 269 to the control valve 271, also connected by means of the flexible conduit 272 to any suitable source of air under pressure. The valve 271 is also arranged with means for connecting the pipe 269 into the atmosphere, so that pressure in the cylinder above the piston may be relieved to release the clamps.

From the above it will be understood that after proper positioning of the platform frame 152, the clamp frame 247 may be run out into extended position to catch the projecting end of a rug strip between the jaws 261 and 262 of each of the clamps. Manipulation of the valve 271 then causes the clamps to seize the end of the rug and the clamp frame may then be retracted into the position shown in Figure 7, pulling the rug out of the rack to that extent. The jaws of the clamps are then released and the leading edge 273 of the rug is ready for securing to the trailing edge 274 of the preceding rug strip.

Means are provided for holding the leading end of the rug strip in position and also for supporting the lapped edges during the stitching operation. Journaled in the frame 152 is a shaft 276 adjacent each end of which is fixed a gear 277, each gear meshing with the rack teeth 278 of a vertically disposed slide 279. The tops of the two slides are connected by a channel 281 so that rotation of the shaft 276 in one direction raises the channel to clamp the rug strip against the rubber block 282 suitably supported on the frame 152. Rotation of the shaft 276 in the other direction lowers the channel 281 to a position below the path of movement of the clamp frame 247. The shaft 276 is also provided with a sprocket wheel connected by the chain 283 with the piston rod 284 extending from a piston disposed in the air cylinder 286. Each end of the air cylinder is connected by the pipes 287 with the valve 288 connected into the air line 272, so that the piston in the cylinder 286 and connected piston rod 284 may be moved in either direction at the will of the operator.

Also journaled in the frame 152 is a shaft 289 upon which is fixed a plate 291 extending transversely across the frame 152 and provided at its outer end with an anvil block 292, against which the staples are driven thru the lapped rug ends. Also fixed on the shaft 289 is a segmental gear 293 meshing with teeth 294 formed in the piston rod 295, the outer end of which is guided in a fixed sleeve 296, and the other end of which is connected to a piston within the air cylinder 297. This air cylinder is also connected by the pipes 298 with a valve 299, having suitable connection with the air line 272. Normally the plate 291 carrying the anvil lies in the horizontal position shown in the dotted lines, but by proper manipulation of the valve 299, the piston rod 296 is forced into extended position to raise the plate and anvil into the operative position shown ready for the stitching or stapling operation.

After the rug has been pulled partially out of the rack and the lapping edges arranged as shown in Figure 7 with the rug firmly held against the block 282 and the anvil in position, a stitching or stapling machine is run across the lap to secure the two ends together. This stitching mechanism is of known type and need not be described in detail, further than to say it comprises a stitch or staple forming mechanism within the head 301 to which wire 302 is fed from the reel 303. The mechanism is driven by the motor 304 controlled by the switch 306. The stitching mechanism is mounted on a carriage 307 having grooved wheels 308 adapted to run on rails 309, suitably arranged on the frame 152. The operator after starting the motor 304 pushes the stitching mechanism carriage along the rails across the frame, so that stitches or staples are applied to the lapped edges of the rug strips to secure them together. Thus the operator is enabled to put any desired number of staples or stitches thru the lapped edges by varying the speed of the carriage across the frame.

After the lapped edges have been stitched together, the channel clamping bar 281 and the anvil plate 291 are dropped out of the way by suitable manipulation of the valves 288 and 299 and the feeding of the connected rugs once more started, thus pulling the rug strip out of the rack until its trailing edge reaches the platform, whereupon the platform is dropped opposite to the next rack and the clamping frame once more brought into operation to pull out the next rug, so that its leading edge may be similarly attached to the trailing edge of the preceding rug.

Figure 9:
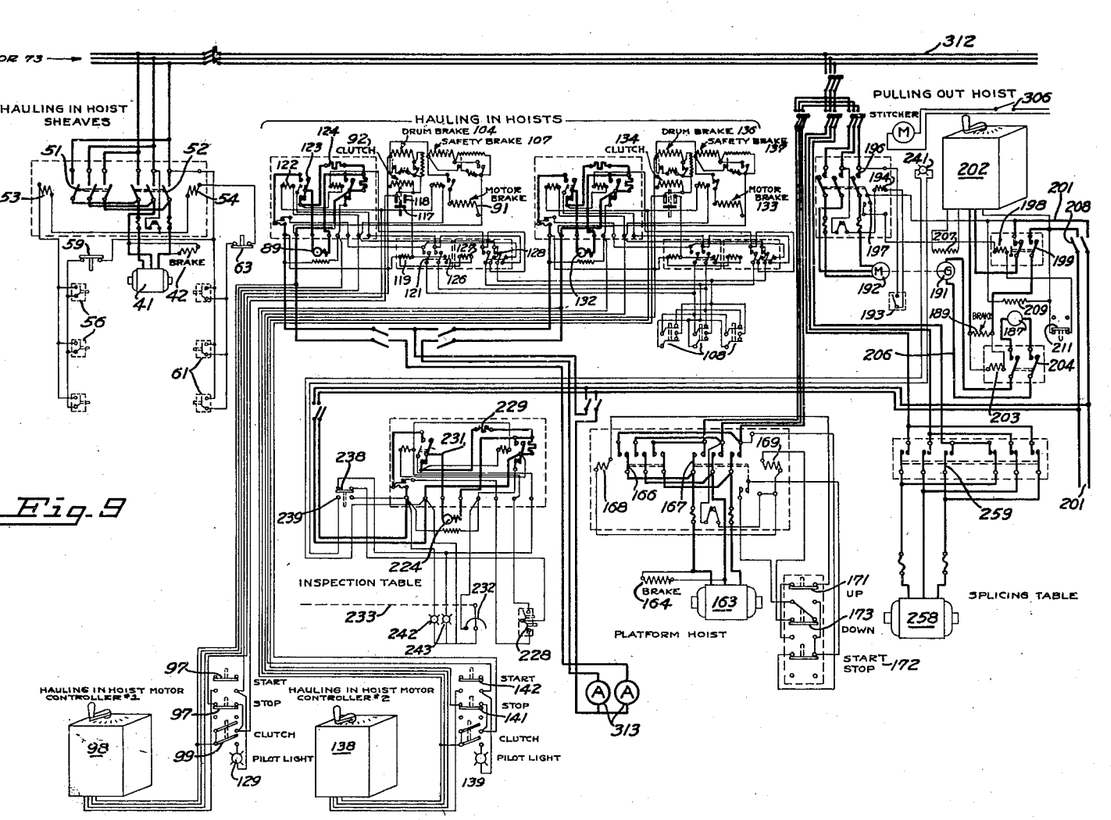
Figure 9 is a diagrammatic view of the driving mechanism and the various electrical controls therefor.

Referring now to Figure 9, it will be noted that three-phase current is supplied to the various electrical apparatus requiring it, thru the main supply leads 312, and that this is in addition to two-phase current supplied to certain of the apparatus from the supply leads 201. In both lines, suitable control switches are placed and such measuring instruments as may be needed, for example, the ammeters 313 connected in circuit with the motors 89 and 132.

I claim:

1. An apparatus for handling sheets comprising a plurality of racks for holding the sheets, means for hauling the sheets into the racks, and means for positioning the hauling in means opposite a selected rack.

2. An apparatus for handling sheets comprising a plurality of racks for holding the sheets, means including a motor-driven drum for hauling the sheets into the racks, means for positioning the hauling-in means opposite a selected rack, and dual control means for the drum motor arranged at opposite ends of the racks.

3. An apparatus for handling sheets comprising a plurality of racks for holding the sheets, means including a motor-driven drum for hauling the sheets into the racks, means for positioning the hauling-in means opposite a selected rack, control means for the drum motor arranged at one end of the racks, secondary control means for the drum motor arranged at the other end of the racks, and means actuated in time with the movement of said sheet for making the secondary control means operative.

4. An apparatus for handling sheets comprising a plurality of racks for holding the sheets, means including a motor-driven drum for hauling the sheets into the racks, means for positioning the hauling-in means opposite a selected rack, control means for the drum motor arranged at one end of the racks, secondary control means for the drum motor arranged at the other end of the racks, and means actuated in time with the movement of said sheet for slowing down said drum motor and for making the secondary control means operative.

5. An apparatus for handling sheets comprising a plurality of racks for holding the sheets, means including a motor-driven drum for hauling the sheets into the racks, means for positioning the hauling-in means opposite a selected rack, a control circuit for the drum motor and having control devices arranged at one end of the racks, a secondary control circuit for the drum motor and having control devices arranged at the other end of the racks, and means actuated in time with the movement of said sheet for connecting said control circuits in parallel.

6. An apparatus for handling sheets comprising a plurality of racks for holding the sheets, means including a motor-driven drum for hauling the sheets into the racks, means for positioning the hauling-in means opposite a selected rack, a control circuit for the drum motor and having control devices arranged at one end of the racks, a secondary control circuit for the drum motor and having control devices arranged at the other end of the racks, and means actuated in time with the movement of said sheet for connecting said control circuits in parallel and for slowing down said drum motor.

7. An apparatus for handling sheets comprising a plurality of racks for holding the sheets, means including a motor-driven drum for hauling the sheets into the racks, means for positioning the hauling-in means opposite a selected rack, a control circuit for the drum motor and having control devices arranged at one end of the racks, a secondary control circuit for the drum motor and having control devices arranged at the other end of the racks, a threaded spindle fixed for rotation with said drum motor, a nut arranged to travel on said spindle, a circuit adapted to be closed by said nut, and means controlled by said circuit for connecting said control circuits in parallel.

8. An apparatus for handling sheets comprising a plurality of racks for holding the sheets, means including a motor-driven drum for hauling the sheets into the racks, means for positioning the hauling-in means opposite a selected rack, a control circuit for the drum motor and having control devices arranged at one end of the racks, a secondary control circuit for the drum motor and having control devices arranged at the other end of the racks, a threaded spindle fixed for rotation with said drum motor, a nut arranged to travel on said spindle, a circuit adapted to be closed by said nut, and means controlled by said circuit for connecting said control circuits in parallel and for slowing down said drum motor.

9. An apparatus for handling sheets comprising a plurality of racks for holding the sheets, means including a motor-driven drum for hauling the sheets into the racks, means for positioning the hauling-in means opposite a selected rack, primary controls for the drum motor arranged at one end of the racks, secondary controls for the drum motor arranged at the other end of the racks, and means actuated in time with the movement of said sheet for making the secondary controls operative and for actuating a signal adjacent the primary controls.

10. An apparatus for handling sheets comprising a plurality of racks for holding the sheets, means including a motor-driven drum for hauling the sheets into the racks, means for positioning the hauling-in means opposite a selected rack, primary controls for the drum motor arranged at one end of the racks, secondary controls for the drum motor arranged at the other end of the racks, means actuated in time with the movement of said sheet for making the secondary controls effective and for slowing down said drum motor and for signaling the new condition at a point adjacent the primary controls.

11. An apparatus for handling sheets comprising a tier of racks for holding the sheets, a motor driven drum, a cable adapted to be wound up on said drum for hauling the sheets into the racks, a pulley over which said cable passes and means for positioning the pulley opposite a selected rack.

12. An apparatus for handling sheets comprising a tier of racks for holding the sheets, a motor driven drum, a cable adapted to be wound up on said drum for hauling the sheets into the racks, a pulley over which said cable passes, motor driven means for positioning the pulley opposite a selected rack, and a remote control for said motor driven means.

13. An apparatus for handling sheets comprising a tier of racks for holding the sheets, a motor driven drum, a cable adapted to be wound up on said drum for hauling the sheets into the racks, a pulley over which said cable passes, motor driven means for positioning the pulley opposite a selected rack, an electric circuit having a remote control switch for said motor driven means, and safety switches in said circuit adapted to be opened when said pulley is moved in either direction past predetermined points.

14. An apparatus for handling sheets comprising a tier of racks for holding the sheets, a frame adjustable opposite a selected rack, and means on said frame for seizing a sheet and pulling it out of its rack.

15. An apparatus for handling sheets comprising a tier of racks for holding the sheets, a frame adjustable opposite a selected rack, a frame slidably arranged in the adjustable frame, clamp mechanism on the slidable frame adapted to seize a sheet in its rack, and means for actuating the clamp mechanism and for reciprocating the slidable frame.

16. An apparatus for handling sheets comprising a tier of racks for holding the sheets, a frame adjustable opposite a selected rack, a frame slidably arranged in the adjustable frame, clamp mechanism on the slidable frame adapted to seize a sheet in its rack, and means on the adjustable frame for actuating the clamp mechanism and for reciprocating the slidable frame.

17. An apparatus for handling sheets comprising a tier of racks for holding the sheets, a frame adjustable opposite a selected rack, a frame slidably arranged in the adjustable frame, clamp mechanism on the slidable frame adapted to seize a sheet in its rack, fluid pressure operated means for actuating said clamp mechanism, motor driven means for reciprocating said slidable frame, and mechanism on said adjustable frame for controlling the fluid pressure operated means and the motor driven means.

18. The combination with a machine for applying designs to a rug strip, of a rack for receiving the strip from the machine, means for hauling the rug strip into the rack, means at the receiving end of the rack for controlling the hauling-in means, secondary means at the opposite end of the rack for controlling the hauling-in means, and means acting in time with the movement of the hauling-in means for rendering the secondary control means operative as the leading edge of the rug strip nears the discharge end of the rack.

19. An apparatus for handling sheets comprising a tier of racks for holding the sheets, a cable for hauling the sheets into the racks, a pulley over which said cable passes, means for positioning the pulley opposite a selected rack, and means for winding up said cable.

20. An apparatus for handling sheets comprising a plurality of racks for holding the sheets, means including a motor-driven drum for hauling the sheets into the racks, control means for the drum motor arranged at one end of the racks, secondary control means for the drum motor arranged at the other end of the racks, and means actuated in time with the movement of said sheet for controlling the speed of the drum motor.

21. An apparatus for handling sheets comprising a tier of racks for holding the sheets, a cable for hauling the sheets into the racks, means for winding up said cable, and means actuated in time with the movement of said sheet for slowing down the winding up means.

22. An apparatus for handling sheets comprising a plurality of racks for holding the sheets, means including a motor-driven drum for hauling the sheets into the racks, and dual control means for the drum motor at opposite ends of the racks.

23. An apparatus for handling sheets comprising a plurality of racks for holding the sheets, means including a motor-driven drum for hauling the sheets into the racks, control means for the drum motor at one end of the racks, secondary control means for the drum motor at the other end of the racks, and means actuated in time with the movement of said sheet for slowing down the drum motor.

24. An apparatus for handling sheets comprising a plurality of racks for holding the sheets, means including a motor-driven drum for hauling the sheets into the racks, control means for the drum motor at one end of the racks, secondary control means for the drum motor at the other end of the racks, and means actuated in time with the movement of said sheet for slowing down the drum of the preceding motor and for making the secondary control means operative.

25. An apparatus for handling sheets comprising a tier of racks for holding the sheets, electrically driven means for hauling the sheets into the rack, a control circuit for the electrically driven means and having control devices at one end of the racks, a secondary control circuit for the electrically driven means and having control devices at the other end of the racks, and means actuated in time with the movement of said sheet for connecting said control circuits in parallel.

26. An apparatus for handling sheets comprising a tier of racks for holding the sheets, electrically driven means for hauling the sheets into the rack, a control circuit for the electrically driven means and having control devices at one end of the racks, a secondary control circuit for the electrically driven means and having control devices at the other end of the racks, and means actuated in time with the movement of said sheet for controlling the speed of the electrically driven means.

27. An apparatus for handling sheets comprising a plurality of racks for holding the sheets, means including a motor-driven drum for hauling the sheets into the racks, means for positioning the hauling-in means opposite a selected rack, control means for the drum motor arranged at one end of the racks, secondary control means for the drum motor arranged at the other end of the racks, and means actuated in time with the movement of said sheet for controlling the speed of the drum motor.

28. An apparatus for handling sheets comprising a plurality of tiers of racks, a frame adjustable opposite a selected tier, a motor driven drum on said frame, a cable adapted to be wound upon said drum for hauling the sheets into the racks, and a pulley over which said cable passes and adjustable on said frame opposite a selected rack.

29. An apparatus for handling sheets comprising a tier of racks for holding the sheets, a frame at the end of the tier, a motor driven drum on said frame, a cable adapted to be wound upon said drum for hauling the sheets into the racks, an arm adjustable on said frame opposite a selected rack, a pulley on said arm over which said cable passes, and a motor driven chain on said frame for supporting and moving said arm.

30. An apparatus for handling sheets comprising a plurality of tiers of racks for holding the sheets, an operating station at which the sheets are treated and adjustable opposite the entrance end of a selected tier, a frame adjustable opposite the exit end of the same tier, and means on said frame for hauling a treated sheet into a selected rack.

31. An apparatus for handling sheets comprising tiers of racks for holding the sheets, a main frame movable across the ends of the tiers to a selected tier, a pulling out frame movable on the main frame for adjustment opposite a selected rack, means on the pulling out frame for seizing the sheet in the rack, and means for actuating the pulling out frame to pull the sheet out of the rack.

In testimony whereof, I have hereunto set my hand.

LELAND S. ROSENER.